(12) United States Patent
Schroeder

(10) Patent No.: US 6,310,474 B1
(45) Date of Patent: Oct. 30, 2001

(54) METHOD AND APPARATUS FOR DETECTING THE DIRECTION OF CRANKSHAFT ROTATION DURING A SINGLE TOOTH/SLOT TRANSITION

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/283,359

(22) Filed: Mar. 31, 1999

(51) Int. Cl.$^7$ ...................................................... G01B 7/14
(52) U.S. Cl. ................ 324/207.25; 324/165; 324/207.21
(58) Field of Search ........................ 324/207.21, 207.25, 324/165, 207.2, 207.24, 233; 340/672; 338/32 R, 32 H

(56) References Cited

U.S. PATENT DOCUMENTS 4,992,733 * 2/1991 Griebeler ........................ 324/207.21

* cited by examiner

Primary Examiner—Walter E. Snow
(74) Attorney, Agent, or Firm—Margaret A. Dobrowitsky

(57) ABSTRACT

A direction of rotation detection apparatus and method using the outputs of a single differential sequential sensor employing two matched magnetostatic elements, ie., either Hall elements or magnetoresistors (MRs), to extract direction of rotation information from the passage of a single tooth edge of a target wheel. The two matched sensing elements are spaced in close proximity to each other, preferably on the order preferably of about 1 mm to about 2 mm apart, in the circumferential direction of the target wheel and generate two identical angularly offset signals from the passage of a single tooth edge of a target wheel which are input to a signal conditioning circuit. Within the signal conditioning circuit, the two sensor signals are differentially amplified to produce a differential signal whereby the polarity of the differential signal enables one of two comparators with respective reference voltages. The output of the enabled comparator is processed and converted into a digital output signal whose voltage level indicates the direction of rotation of the target wheel.

9 Claims, 10 Drawing Sheets

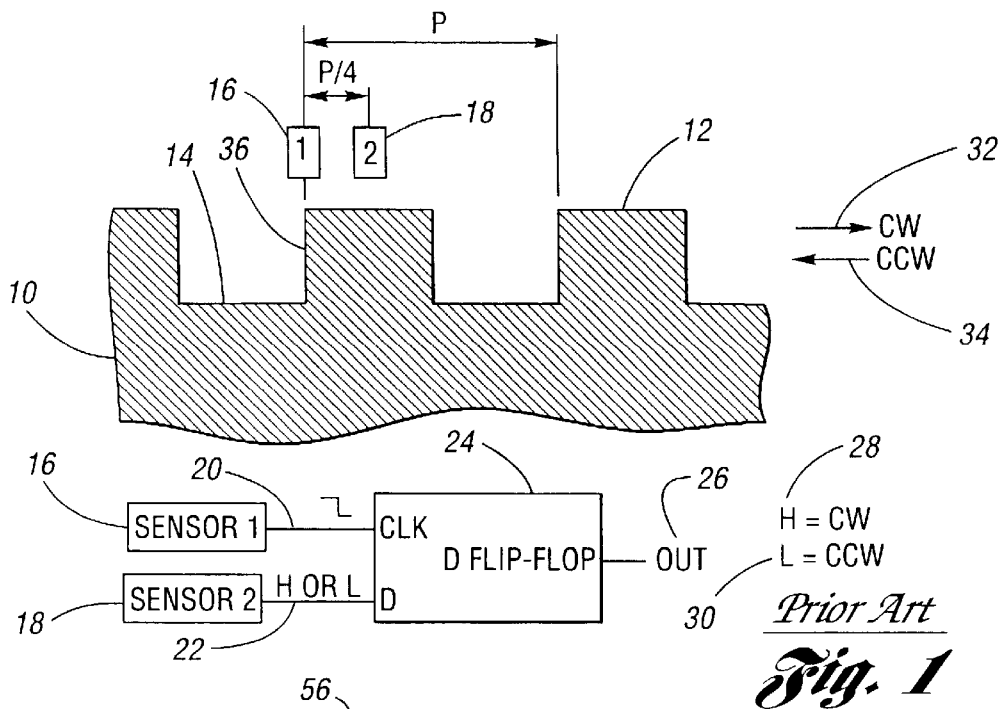
*Fig. 1*
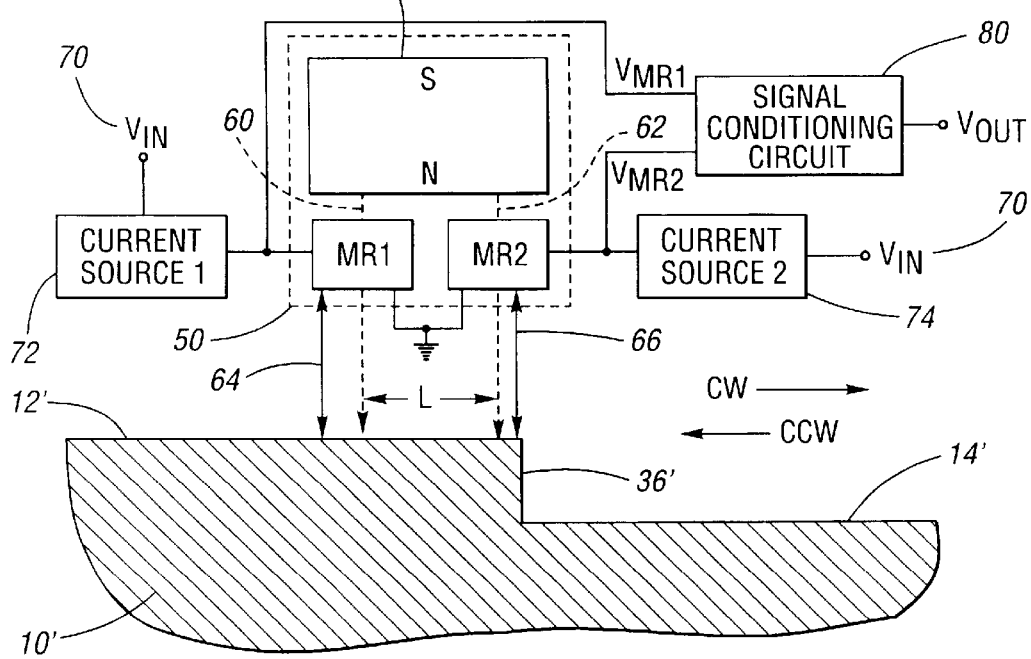
*Fig. 2*
| | $V_2 > V_1$ | $V_2 < V_1$ |
|---|---|---|
| $V_{MR1} > V_{MR2}$ ($V_D > 0$) | CW | CCW |
| $V_{MR1} < V_{MR2}$ ($V_D < 0$) | CCW | CW |
*Fig. 8*

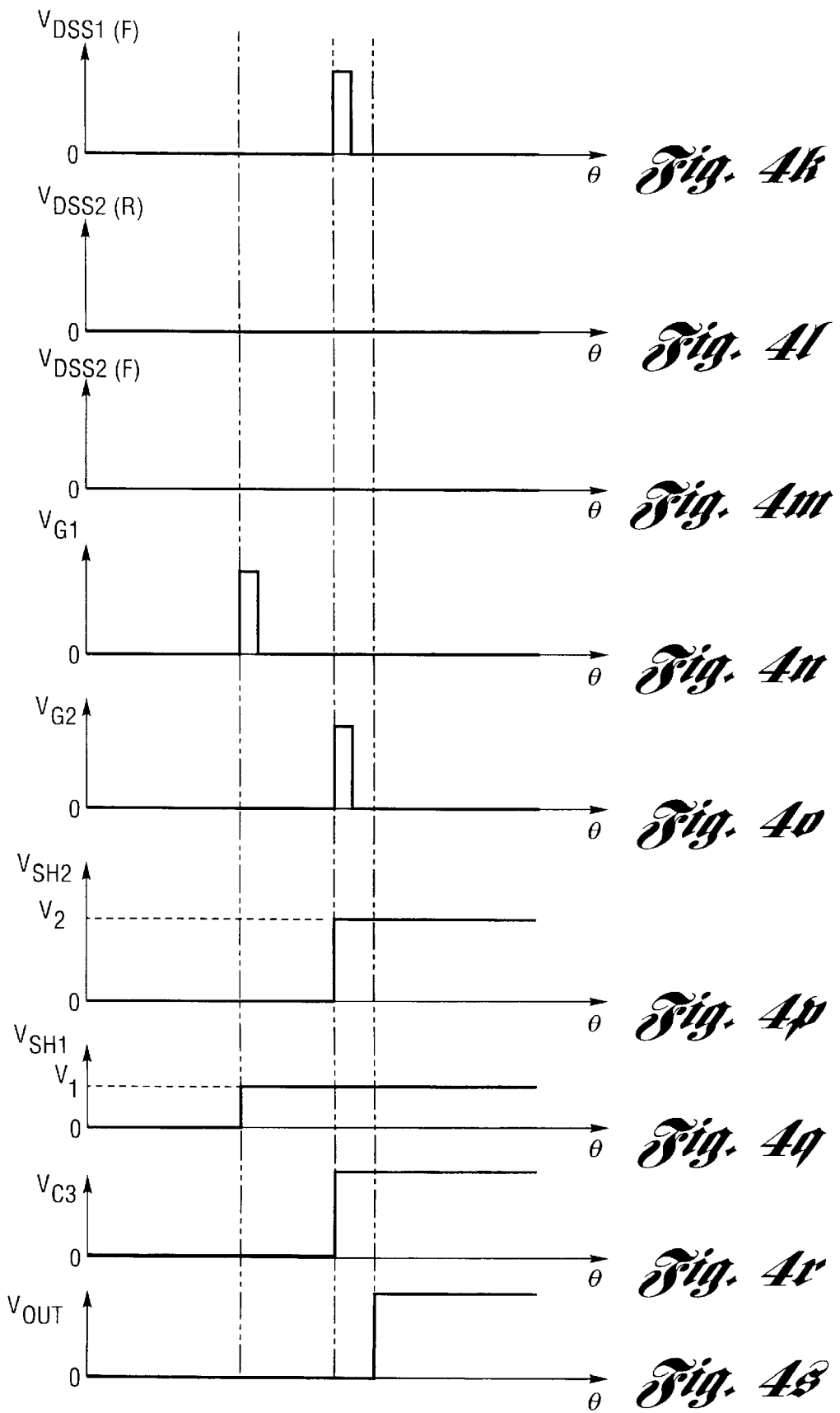

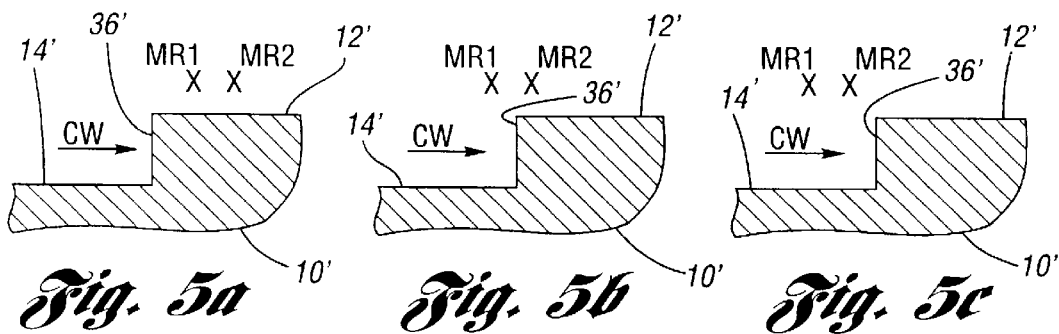
*Fig. 5a*  *Fig. 5b*  *Fig. 5c*
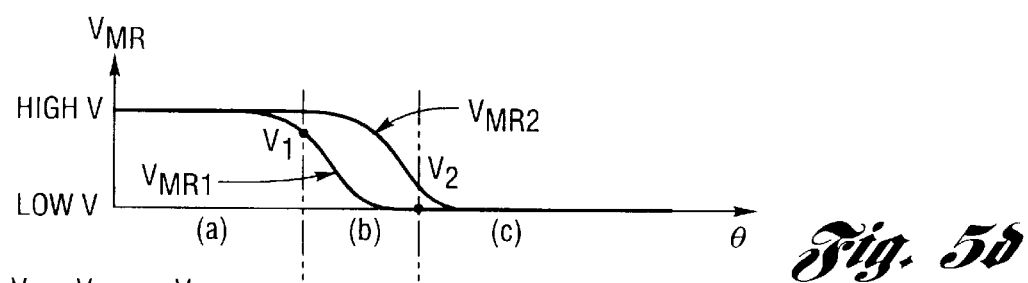
*Fig. 5d*
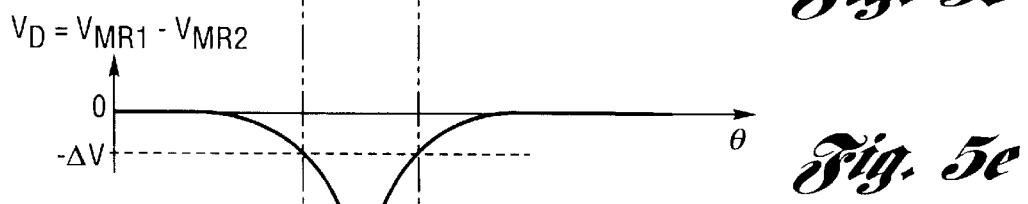
*Fig. 5e*
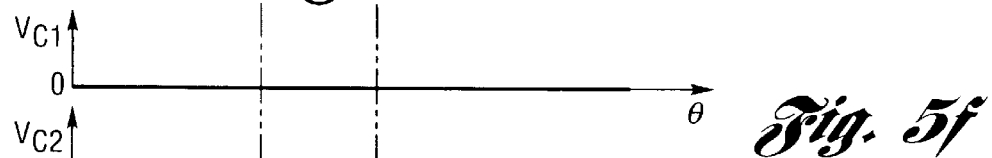
*Fig. 5f*
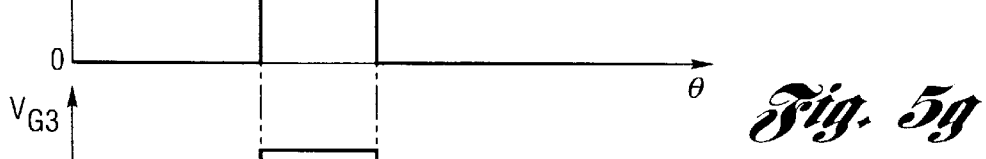
*Fig. 5g*
*Fig. 5h*
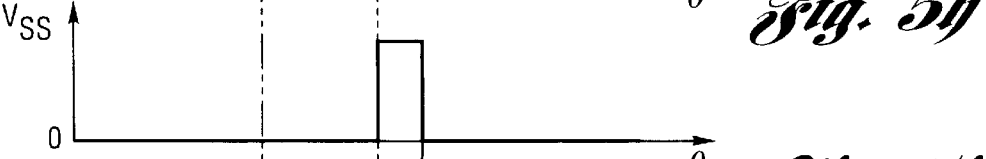
*Fig. 5i*
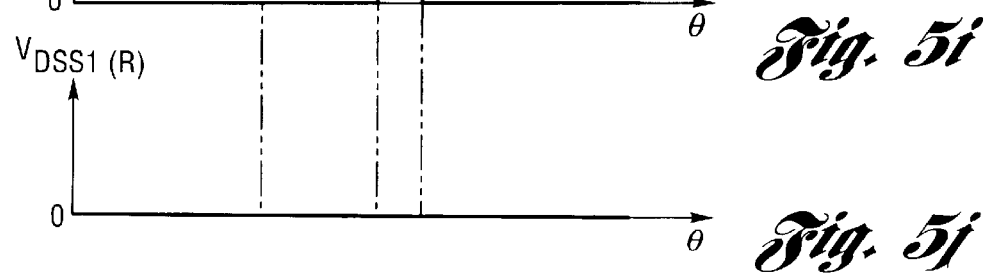
*Fig. 5j*

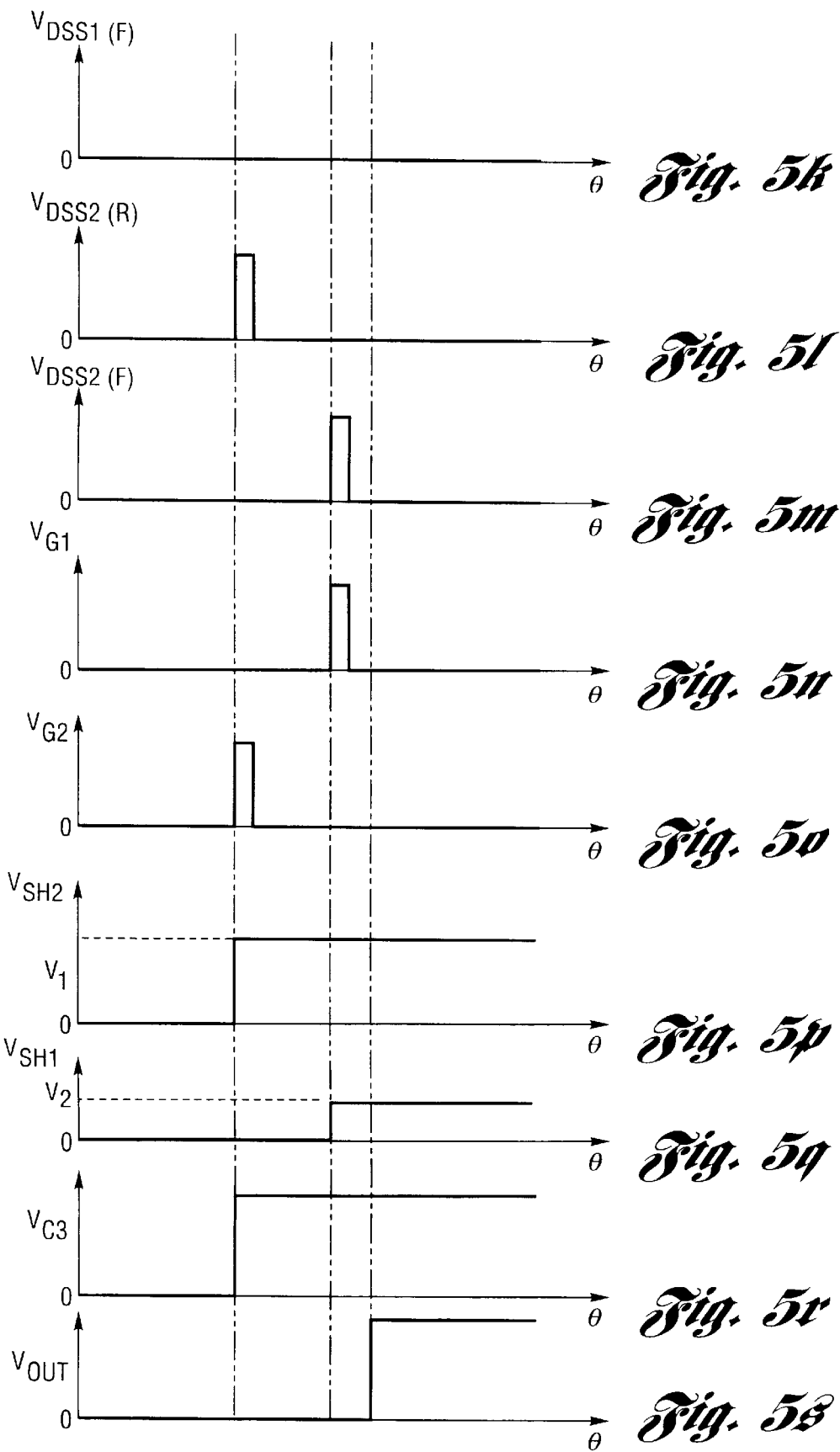

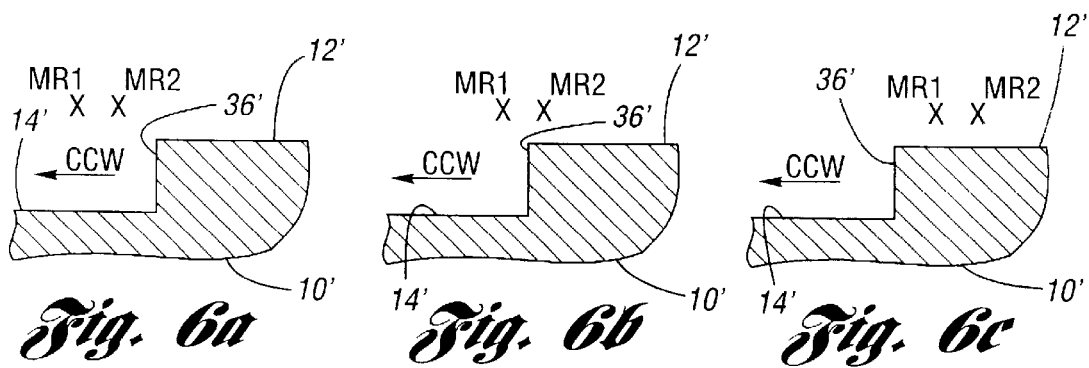
*Fig. 6a*  *Fig. 6b*  *Fig. 6c*
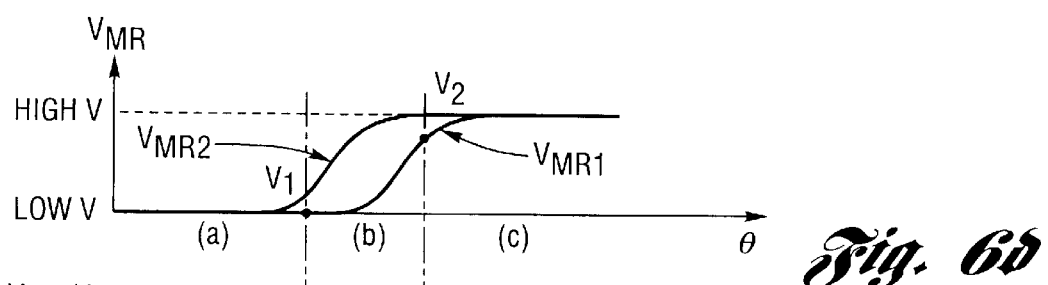
*Fig. 6d*
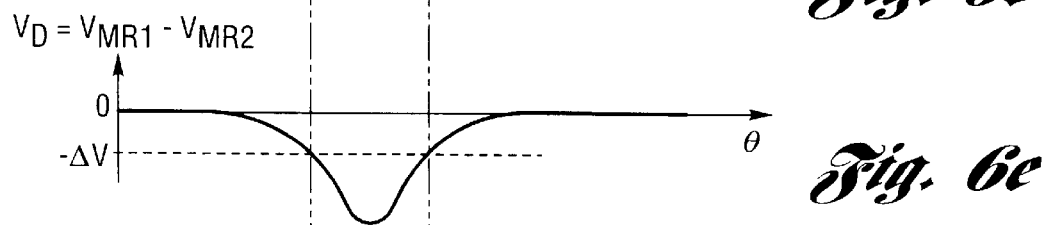
*Fig. 6e*
*Fig. 6f*
*Fig. 6g*
*Fig. 6h*
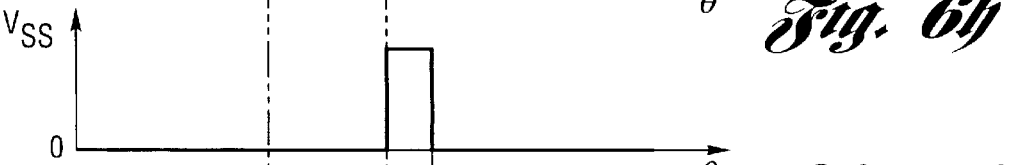
*Fig. 6i*
*Fig. 6j*

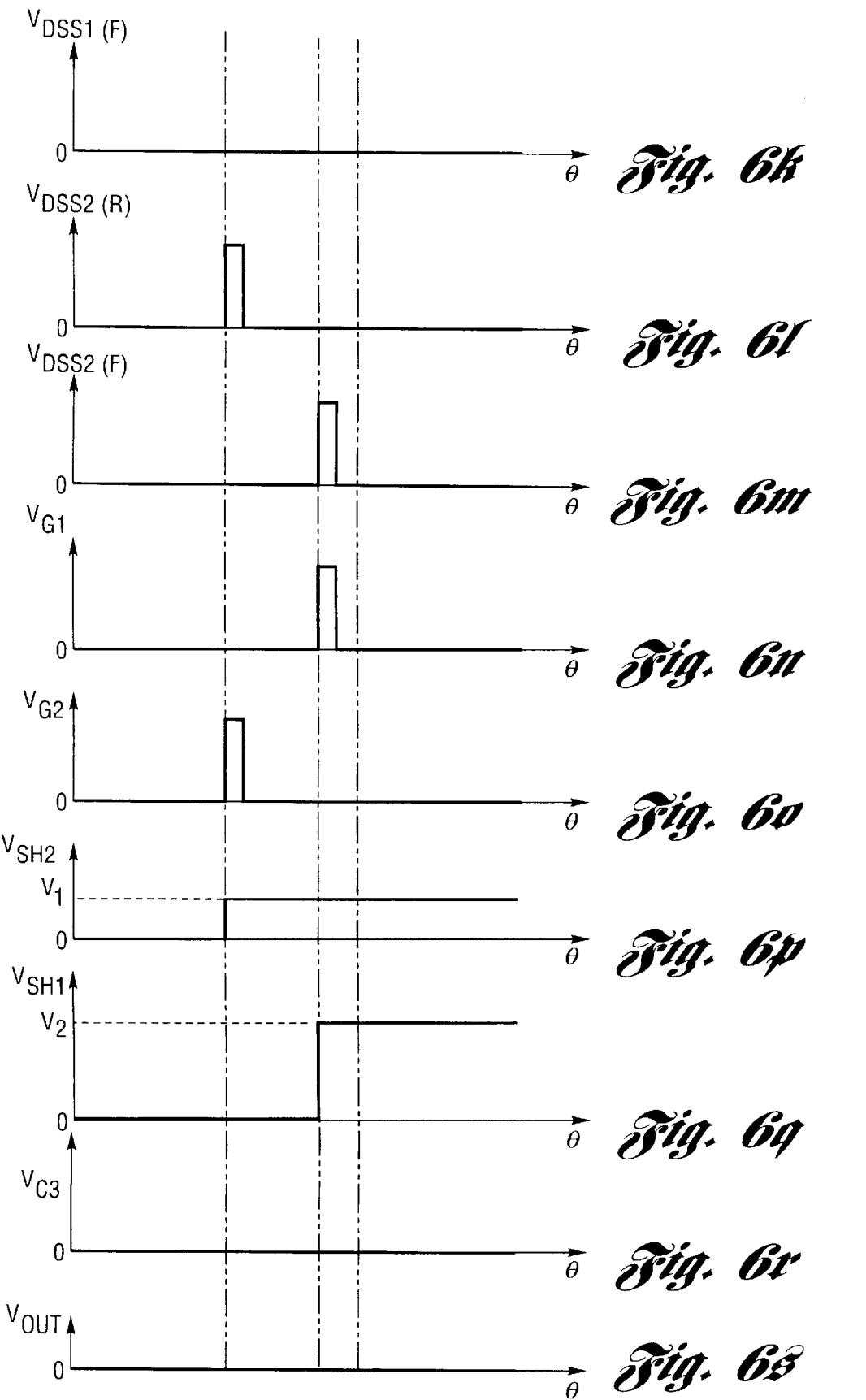

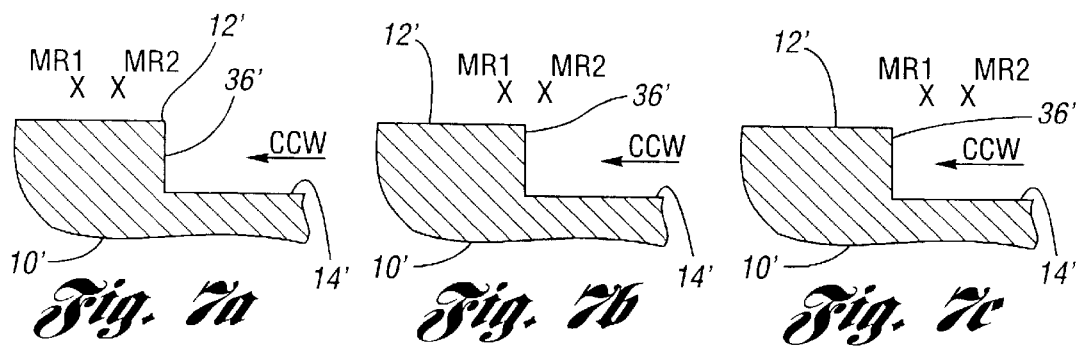
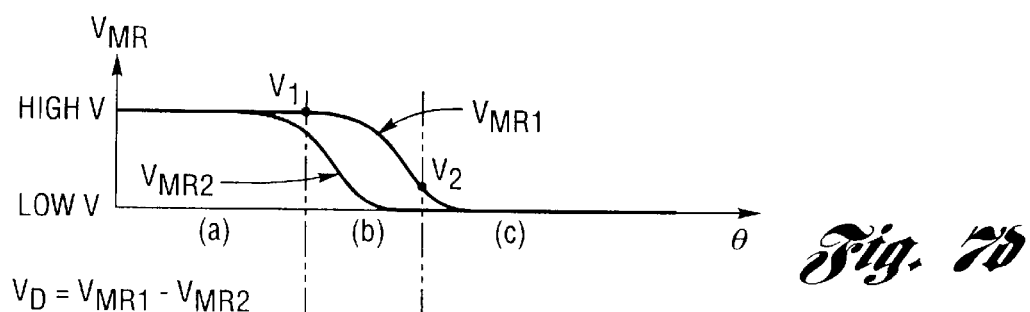
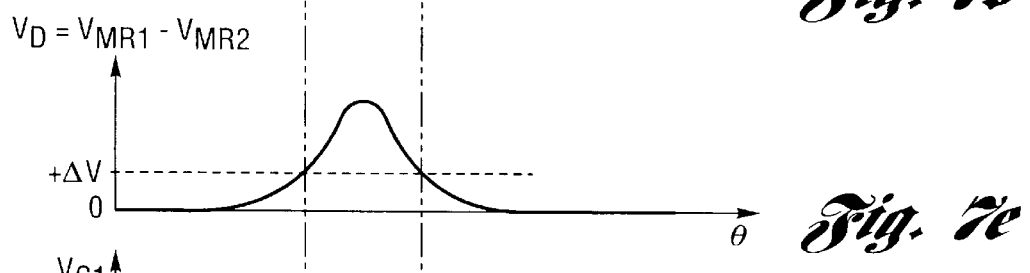
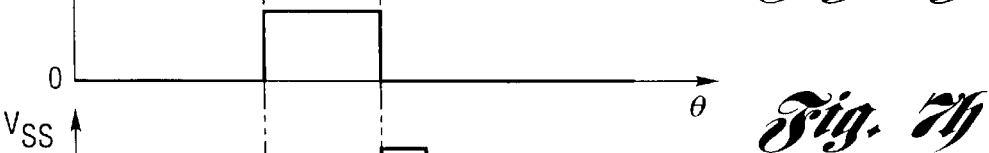
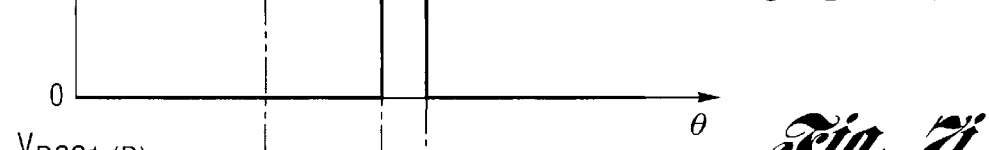
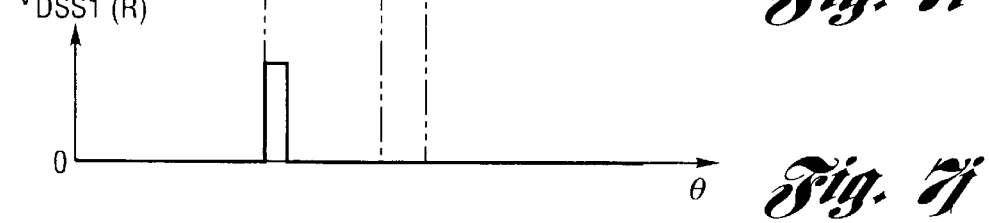

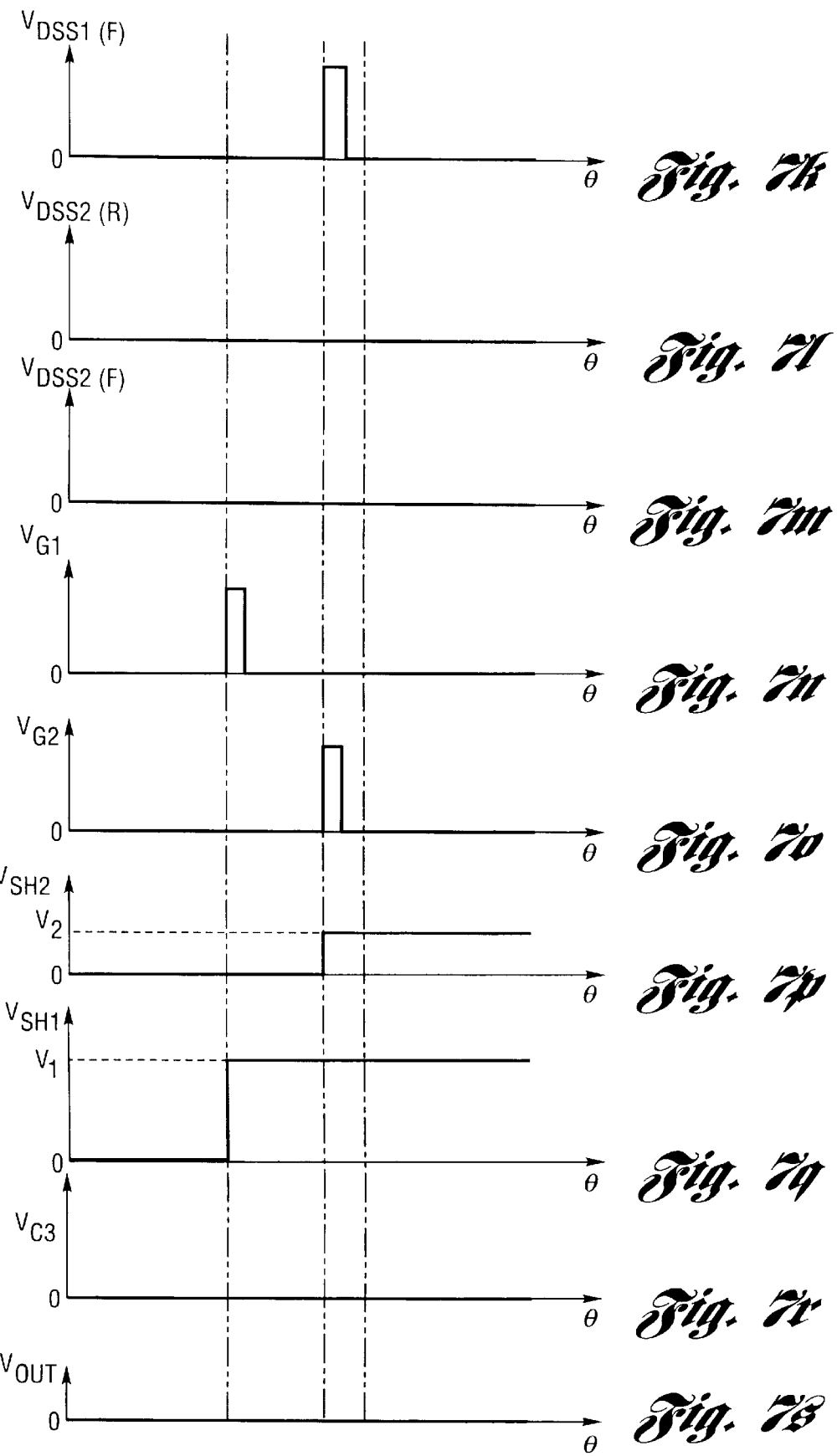

US 6,310,474 B1

METHOD AND APPARATUS FOR DETECTING THE DIRECTION OF CRANKSHAFT ROTATION DURING A SINGLE TOOTH/SLOT TRANSITION

TECHNICAL FIELD

The present invention relates to a method of sensing direction of crankshaft rotation and more particularly to a method and apparatus to sense direction of crankshaft rotation from the passage of single tooth edges of an encoder or target wheel with a single, currently used, differential sequential sensor employing either Hall elements or magnetoresistors.

BACKGROUND OF THE INVENTION

It is well known in the art that the resistance modulation of Hall elements or magnetoresistors can be employed in position and speed sensors with respect to moving ferromagnetic materials or objects (see for example U.S. Pat. Nos. 4,835,467; 4,926,122; and 4,939,456).

Increasingly more sophisticated spark timing and emission controls introduced the need for crankshaft sensors capable of providing not only precise position information, but also, during cranking, a direction of rotation signal. Currently, as shown in FIG. 1, direction of rotation, clockwise (CW) 32 or counterclockwise (CCW) 34, is most commonly obtained from an encoder wheel 10, also called a target wheel, having a plurality of teeth 12 and slots 14 of essentially equal length which have a spacing between adjacent teeth or a spacing between adjacent slots of P, called the tooth/slot pitch. The teeth 12 and slots 14 are sensed by SENSOR1 16 and SENSOR2 18 in quadrature (i.e. with spacing between sensors equal to one-quarter of the tooth/slot pitch P). Equal lengths of teeth 12 and equal lengths of slots 14 and the one-quarter pitch spacing between sensors are preferred, but not absolutely necessary. The square wave output signals from SENSOR1 16 and SENSOR2 18 are fed as a clock input 20 and a data input 22 into a D type FLIP-FLOP 24 whose output 26 provides a direction indication and is either high (H) 28 or low (L) 30 depending on the direction of rotation of the target wheel 10. Due to the large P/4 distance between SENSOR1 16 and SENSOR2 18, a major disadvantage of the current method is the inability to detect the change of rotational direction of the target wheel when a single tooth edge, such as tooth edge 36, is oscillating around a single sensor, such as SENSOR1 16. In this case, SENSOR1 16 would detect the back and forth oscillating single tooth edge 36 as the rising and falling edges of passing teeth 12. Since the direction indication 26 would remain unchanged, serious position errors would be generated. For this reason, and due to the necessity of adding a second sensor, the conventional method of detecting direction of rotation is not suitable for automotive crankshaft sensors.

What is needed is a method and apparatus whereby the direction of rotation of an automotive crankshaft can be obtained from the passage of a single tooth edge of a target wheel.

SUMMARY OF THE INVENTION

The present invention provides detection of direction of rotation via the outputs of a differential sequential sensor employing two matched sensing elements, either Hall elements or magnetoresistors (MRs), to extract direction of rotation information from the passage of a single tooth edge of a target wheel. The two matched sensing elements are spaced in close proximity to each other, preferably on the order of about 1 mm to 2 mm apart, in the circumferential direction of the target wheel and generate two identical angularly offset signals from the passage of a single tooth edge of a target wheel which are input to a signal conditioning circuit. Within the signal conditioning circuit, the two sensor signals are differentially amplified to produce a differential signal whereby the polarity of the differential signal enables one of two comparators with respective reference voltages. The output of the enabled comparator is processed and converted into a digital output signal whose voltage level indicates the direction of rotation of the target wheel.

Accordingly, it is an object of the present invention to provide a digital output voltage for detecting direction of rotation of a target wheel at a single tooth edge.

It is an additional object of the present invention to provide a digital output voltage for detecting direction of rotation of a target wheel at a single tooth-slot edge using two closely spaced sensing elements.

These, and additional objects, advantages, features, and benefits of the present invention will become apparent from the following specification.

BRIEF DESCRIPTION OF THE DRAWINGS

FIG. 1 shows a combined environmental depiction and circuit schematic of a conventional direction of rotation sensor.

FIG. 2 depicts an example of a preferred environment of use of the present invention.

FIGS. 5a through 5s show the wave forms generated from FIG. 3 due to the passage of a falling edge of a tooth of a target wheel rotating in a clockwise (CW) direction.

FIGS. 6a through 6s show the wave forms generated from FIG. 3 due to the passage of a rising edge of a tooth of a target wheel rotating in a counterclockwise (CCW) direction.

FIGS. 7a through 7s show the wave forms generated from FIG. 3 due to the passage of a falling edge of a tooth of a target wheel rotating in a counterclockwise (CCW) direction.

FIG. 8 is a table summarizing the results of FIGS. 4a through 7s.

DESCRIPTION OF THE PREFERRED EMBODIMENT

Figure 3:
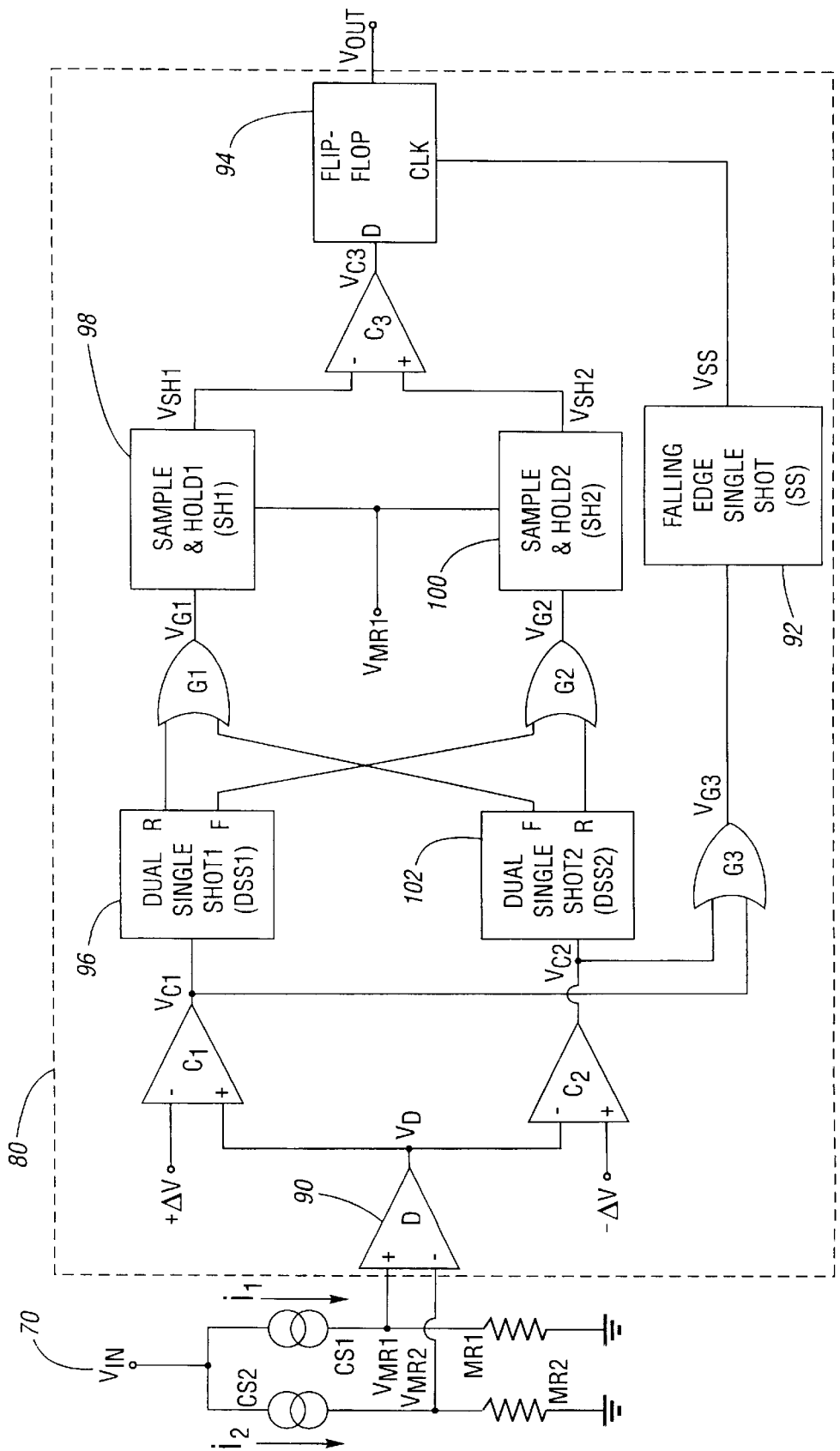
FIG. 3 shows an electronic block diagram of the preferred embodiment of the present invention.

FIG. 2 is a schematic representation of an exemplar automotive environment of use according to the present invention, wherein a target wheel 10' is rotating, such as for example in unison with a crankshaft, a drive shaft or a cam shaft, and the rotative direction thereof is to be sensed. Rotative direction of the target wheel 10' is determined by sensing the passage of either a rising tooth edge 36' or a falling tooth edge using a single differential sequential sensor 50. A tooth edge 36' is considered rising or falling depending upon the direction of rotation of the target wheel 10' with respect to the magnetoresistive sensors MR1 and MR2. The single differential sequential sensor 50 employs two matched magnetoresistor (MR) elements, MR1 and MR2, which are biased by a permanent magnet 56, wherein the magnetic flux 60 and 62 emanating therefrom is represented by the dashed arrows. The magnetic flux 60 and 62 passes from the permanent magnet 56 through the magnetoresistors MR1 and MR2 and through the air gaps 64 and 66 to the target wheel 10'. The target wheel 10' is made of a magnetic material having teeth 12' and spacings 14' therebetween. The spacing L between MR1 and MR2 is between about 1 mm (or less) and about 2 mm (or more) in the circumferential direction of the target wheel 10' and the target wheel is located near the single differential sequential sensor 50 as indicated in FIG. 2.

Power is supplied to CURRENT SOURCE1 72 and CURRENT SOURCE2 74 through voltage source 70. Power is also supplied to signal conditioning circuit 80 through voltage source 70 but is not shown. CURRENT SOURCE1 72 supplies current to MR1 thereby providing for an output voltage $V_{MR1}$ from MR1. CURRENT SOURCE2 74 supplies current to MR2 thereby providing for an output voltage $V_{MR2}$ from MR2. Output voltages $V_{MR1}$ and $V_{MR2}$ are input into signal conditioning circuit 80 whose output voltage $V_{OUT}$ is an indication of the direction of rotation of target wheel 10'. It is to be understood that all voltages are measured with respect to ground unless otherwise indicated herein, and that CURRENT SOURCE1 is matched to CURRENT SOURCE2.

FIG. 3 shows an electronic block diagram of the preferred embodiment of the present invention. It is well known in the art that the resistance of a magnetoresistor will have a larger value when the magnetoresistor is adjacent to a tooth 12' of a target wheel 10' of FIG. 2 than when the magnetoresistor is adjacent to a slot 14' of the target wheel. Thus, when MR1 and MR2 are powered by constant current sources, the output voltages $V_{MR1}$ and $V_{MR2}$ will have higher values when the magnetoresistors MR1 and MR2 are adjacent a tooth 12' of a target wheel 10' than when MR1 and MR2 are adjacent a slot 14' of the target wheel. The circuit of FIG. 3 functions as follows.

As the passage of a tooth edge 36' is sensed by MR1 and MR2, the two sensor signals $V_{MR1}$ and $V_{MR2}$ are input into a differential amplifier 90 to produce a differential signal pulse $V_D$, which in this case $V_D$ is taken to be $V_{MR1}-V_{MR2}$. $V_D$ could also be taken as $V_{MR2}-V_{MR1}$ within the scope of the present invention. During the time that the polarity of $V_D$ is positive and greater than the reference voltages $+\Delta V$, which is applied to the negative input of comparator $C_1$, the output of comparator $C_1$, $V_{C1}$, will be high and the output of comparator $C_2$, $V_{C2}$, will be low. Further, during the time that the polarity of $V_D$ is negative and less than the reference voltage $-\Delta V$, which is applied to the positive input of comparator $C_2$, the output of comparator $C_2$, $V_{C2}$, will be high and the output of comparator $C_1$, $V_{C1}$, will be low. Hence, the output of $C_1$, will be a square wave with a positive voltage level or value for $V_{C2}$, for $V_D$ having positive values greater than $+\Delta V$, whereas the output of $C_2$ will be a square wave with a positive voltage level or value for $V_{C2}$ for VD having negative values less than $-\Delta V$.

The square wave output of either $C_1$ or $C_2$ appears at the output of OR gate $G_3$ as a square wave with a positive voltage for $V_{G3}$ which is input into the FALLING EDGE SINGLE SHOT block 92. FALLING EDGE SINGLE SHOT block 92 outputs a pulse with a positive voltage for $V_{SS}$ whose falling edge is used as the clock input into FLIP-FLOP 94 to latch the output voltage $V_{OUT}$ of the FLIP-FLOP to the value of the input voltage $V_{C3}$ to the FLIP-FLOP. The value of $V_{C3}$ is determined as follows.

If $C_1$ outputs a square wave, as previously described, then DUAL SINGLE SHOT1 96 will output a pulse on the rising and falling edges of the square wave. The rising edge pulse from DUAL SINGLE SHOT1 96 latches the output voltage, $V_{SH1}$, of SAMPLE & HOLD1 98 to the value of $V_{MR1}$ at this time. The falling edge pulse from DUAL SINGLE SHOT1 96 latches the output voltage, $V_{SH2}$, of SAMPLE & HOLD2 100 to the value of $V_{MR1}$ at this time.

On the other hand, if $C_2$ outputs a square wave, as previously described, then DUAL SINGLE SHOT2 102 will output a pulse on the rising and falling edges of the square wave. The rising edge pulse from DUAL SINGLE SHOT2 102 latches the output voltage, $V_{SH2}$, of SAMPLE & HOLD2 100 to the value of $V_{MR1}$ at this time. The falling edge pulse from DUAL SINGLE SHOT2 102 latches the output voltage, $V_{SH1}$, of SAMPLE & HOLD1 98 to the value of $V_{MR1}$ at this time.

Within the scope of the present invention, $V_{MR2}$ could be the sampled voltage of SAMPLE & HOLD1 98 and SAMPLE & HOLD2 100 instead of $V_{MR1}$. $V_{SH1}$ is one input into comparator $C_3$ and $V_{SH2}$ is another input into comparator $C_3$. If $V_{SH2}$ is larger than $V_{SH1}$ then the output of $C_3$, $V_{C3}$, will be a high voltage which will appear as $V_{OUT}$ when a clock pulse is input to FLIP-FLOP 94 as previously described. If $V_{SH1}$ is larger than $V_{SH2}$ then the output of $C_3$, $V_{C3}$, will be a low voltage which will appear as $V_{OUT}$ when a clock pulse is input to FLIP-FLOP 94 as previously described. As will be explained in FIGS. 4a through 7s, the value of VOUT is indicative of the direction of rotation of the target wheel. With $V_D$ taken to be $V_{MR1}-V_{MR2}$ and $V_{MR1}$ being the sampled voltage of SAMPLE & HOLD1 98 and SAMPLE & HOLD2 100, a high voltage for $V_{OUT}$ indicates a CW rotation of the target wheel 10' of FIG. 2 whereas a low voltage for Vout indicates a CCW rotation of the target wheel.

Figures 4A, 4B, 4C:
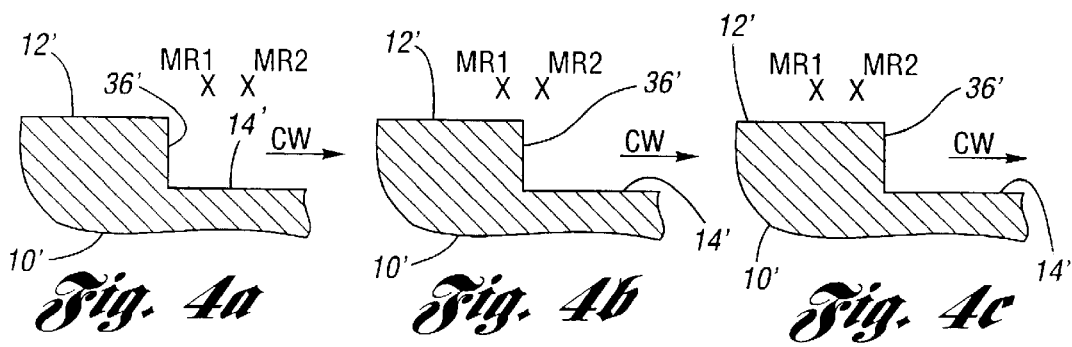
FIGS. 4a through 4s show the wave forms generated from FIG. 3 due to the passage of a rising edge of a tooth of a target wheel rotating in a clockwise (CW) direction.

FIGS. 4a through 4s show the wave forms generated from FIG. 3 due to the passage of a rising edge 36' of a tooth 12' of a target wheel 10' rotating in a clockwise (CW) direction. The sensors MR1 and MR2 are initially adjacent to a slot 14' of the target wheel 10' which is rotating in a CW direction as shown in FIG. 4a and $V_{MR1}$ and $V_{MR2}$ have a low value as depicted in (a) of FIG. 4d. As the target wheel 10' rotates CW, MR1 becomes adjacent to a tooth 12' of the target wheel whereas MR2 is still adjacent to a slot 14' but is approaching the tooth as shown in FIG. 4b. During this time $V_{MR1}$, rises quickly to a high level whereas $V_{MR2}$ starts to rise as MR2 approaches the tooth 12' as shown in (b) of FIG. 4d. As the target wheel 10' continues to rotate CW, both MR1 and MR2 become adjacent to a tooth 12' and $V_{MR1}$ and $V_{MR2}$ are at a high level as shown in (c) of FIG. 4d.

Figure 4D:
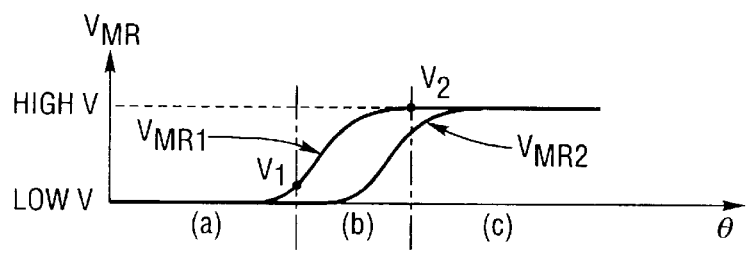
Figure 4E:
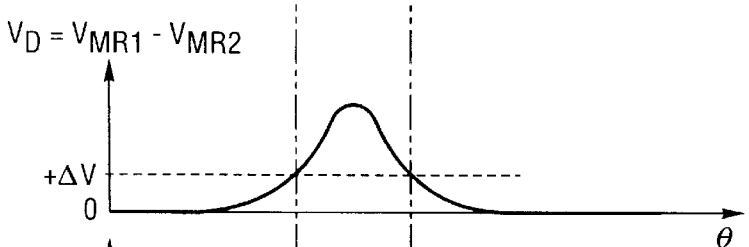
Figure 4F:
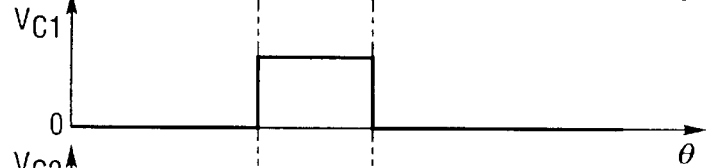
Figure 4G:
Figure 4H:
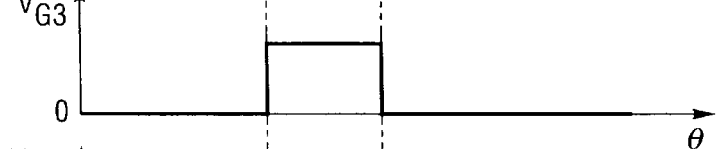

FIG. 4e depicts the differential voltage pulse $V_D$, which is positive in this case, thereby, producing a square wave output, $V_{C1}$, from comparator $C_1$ of FIG. 3, as shown in FIG. 4f, which is then input to DUAL SINGLE SHOT1 96 of FIG. 3. The DUAL SINGLE SHOT1 of FIG. 3 outputs a pulse $V_{DSS1}$ (R) of FIG. 4j on the rising edge of $V_{C1}$ as well as a pulse $V_{DSS1}$ (F) of FIG. 4k on the falling edge of $V_{C1}$.

$V_{DSS1}$ (R) is input to OR gate $G_1$, of FIG. 3 and the output of OR gate $G_1$, $V_{G1}$, shown in FIG. 4n is input to SAMPLE & HOLD1 98 of FIG. 3. The output of SAMPLE & HOLD1 98 of FIG. 3, $V_{SH1}$, is denoted as $V_1$, and is depicted in FIGS. 4d and 4q. $V_1$, in FIG. 4d, is the value of $V_{MR1}$ at the rising edge of $V_{C1}$, of FIG. 4f and is applied to the negative input of comparator $C_3$ of FIG. 3.

$V_{DSS1}$ (F) is input to OR gate $G_2$ of FIG. 3 and the output of OR gate $G_2$, $V_{G2}$, shown in FIG. 4o is input to SAMPLE & HOLD2 100 of FIG. 3. The output of SAMPLE & HOLD2 100 of FIG. 3, $V_{SH2}$, is denoted as $V_2$ and is depicted in FIGS. 4d and 4p. $V_2$, in FIG. 4d, is the value of $V_{MR1}$ at the falling edge of $V_{C1}$ of FIG. 4f and is applied to the positive input of comparator $C_3$ of FIG. 3.

As can be seen in FIG. 4d and by comparing FIG. 4p to FIG. 4q, $V_2$ is greater than $V_1$. Thus the output of comparator $C_3$ of FIG. 3, $V_{C3}$, will have a high value as shown in FIG. 4r. $V_{C3}$ in FIG. 3 is input to FLIP-FLOP 94 and is transferred to the output of the FLIP-FLOP where it appears as Vout upon reception of the falling edge of a clock pulse, $V_{SS}$, to the FLIP-FLOP from the output of FALLING EDGE SINGLE SHOT 92.

Figure 4I:
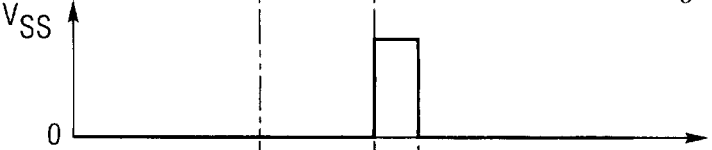
Figure 4J:

The clock pulse, $V_{SS}$, is shown in FIG. 4i. $V_{SS}$ is the output of FALLING EDGE SINGLE SHOT 92 of FIG. 3. The FALLING EDGE SINGLE SHOT 92 of FIG. 3 generates the pulse $V_{SS}$ upon the falling edge of $V_{G3}$ of FIG. 4h which is obtained from the falling edge of $V_{C1}$, via OR gate $G_3$ of FIG. 3. Thus, when the clock pulse, $V_{SS}$, is input to FLIP-FLOP 94 of FIG. 3, $V_{OUT}$ will have a high value as depicted in FIG. 4s indicating, in this case, a CW rotation of the target wheel 10' of FIG. 3.

FIG. 5 shows the wave forms generated from FIG. 3 due to the passage of a falling edge 36' of a tooth 12' of a target wheel 10' rotating in a clockwise (CW) direction. The sensors MR1 and MR2 are initially adjacent to a tooth 12' of the target wheel 10' which is rotating in a CW direction as shown in FIG. 5a and $V_{MR1}$ and $V_{MR2}$ have a high value as depicted in (a) of FIG. 5d. As the target wheel 10' rotates CW, MR1 becomes adjacent to a slot 14' of the target wheel whereas MR2 is still adjacent to a tooth 12' but is approaching the slot as shown in FIG. 5b. During this time $V_{MR1}$ falls quickly to a low level whereas $V_{MR2}$ starts to fall as MR2 approaches the slot 14' as shown in (b) of FIG. 5d. As the target wheel 10' continues to rotate CW, both MR1 and MR2 become adjacent to a slot 14' and $V_{MR1}$ and $V_{MR2}$ are at a low level as shown in (c) of FIG. 5d.

FIG. 5e depicts the differential voltage pulse $V_D$, which is negative in this case, thereby, producing a square wave output, $V_{C2}$, from comparator $C_2$ of FIG. 3, as shown in FIG. 5g, which is then input to DUAL SINGLE SHOT2 102 of FIG. 3. The DUAL SINGLE SHOT2 102 of FIG. 3 outputs a pulse $V_{DSS2}$ (R) of FIG. 5l on the rising edge of $V_{C2}$ as well as a pulse $V_{DSS2}$ (F) of FIG. 5o on the falling edge of $V_{C2}$.

$V_{DSS2}$ (R) is input to OR gate $G_2$ of FIG. 3 and the output of OR gate $G_2$, $V_{G2}$, shown in FIG. 5o is input to SAMPLE & HOLD2 100 of FIG. 3. The output of SAMPLE & HOLD2 100 of FIG. 3, $V_{SH2}$, is denoted as $V_1$, and is depicted in FIGS. 5d and 5p. $V_1$, in FIG. 5d, is the value of $V_{MR1}$ at the rising edge of $V_{C2}$ of FIG. 5g and is applied to the positive input of comparator $C_3$ of FIG. 3.

$V_{DSS2}$ (F) is input to OR gate $G_1$ of FIG. 3 and the output of OR gate $G_1$, $V_{G1}$, shown in FIG. 5n is input to SAMPLE & HOLD1 98 of FIG. 3. The output of SAMPLE & HOLD1 98 of FIG. 3, $V_{SH1}$, is denoted as $V_2$ and is depicted in FIGS. 5d and 5q. $V_2$, in FIG. 5d, is the value of $V_{MR1}$ at the falling edge of $V_{C2}$ of FIG. 5g and is applied to the negative input of comparator $C_3$ of FIG. 3.

As can be seen in FIG. 5d and by comparing FIG. 5p to FIG. 5q, $V_1$, is greater than $V_2$. Thus the output of comparator $C_3$ of FIG. 3, $V_{C3}$, will have a high value as shown in FIG. 5r. $V_{C3}$ in FIG. 3 is input to FLIP-FLOP 94 and is transferred to the output of the FLIP-FLOP where it appears as $V_{OUT}$ upon reception of the falling edge of a clock pulse, $V_{SS}$, to the FLIP-FLOP from the output of FALLING EDGE SINGLE SHOT 92.

The clock pulse, $V_{SS}$, is shown in FIG. 5i. $V_{SS}$ is the output of FALLING EDGE SINGLE SHOT 92 of FIG. 3. The FALLING EDGE SINGLE SHOT 92 of FIG. 3 generates the pulse $V_{SS}$ upon the falling edge of $V_{G3}$ of FIG. 5h which is obtained from the falling edge of $V_{C2}$ via OR gate $G_3$ of FIG. 3. Thus, when the clock pulse, $V_{SS}$, is input to FLIP-FLOP 94 of FIG. 3, $V_{OUT}$ will have a high value as depicted in FIG. 5s indicating, in this case, a CW rotation of the target wheel 10' of FIG. 3.

FIG. 6 shows the wave forms generated from FIG. 3 due to the passage of a rising edge 36' of a tooth 12' of a target wheel 10' rotating in a counterclockwise (CCW) direction. The sensors MR1 and MR2 are initially adjacent to a slot 14' of the target wheel 10' which is rotating in a CCW direction as shown in FIG. 6a and $V_{MR1}$ and $V_{MR2}$ have a low value as depicted in (a) of FIG. 6d. As the target wheel 10' rotates CCW, MR2 becomes adjacent to a tooth 12' of the target wheel whereas MR1 is still adjacent to a slot 14' but is approaching the tooth as shown in FIG. 6b. During this time $V_{MR2}$ rises quickly to a high level whereas $V_{MR1}$ starts to rise as MR1 approaches the tooth 12' as shown in (b) of FIG. 6d. As the target wheel 10' continues to rotate CCW, both MR1 and MR2 become adjacent to a tooth 12' and $V_{MR1}$ and $V_{MR2}$ are at a high level as shown in (c) of FIG. 6d.

FIG. 6e depicts the differential voltage pulse $V_D$, which is negative in this case, thereby, producing a square wave output, $V_{C2}$, from comparator $C_2$ of FIG. 3, as shown in FIG. 6g, which is then input to DUAL SINGLE SHOT2 102 of FIG. 3. The DUAL SINGLE SHOT2 102 of FIG. 3 outputs a pulse $V_{DSS2}$ (R) of FIG. 6l on the rising edge of $V_{C2}$ as well as a pulse $V_{DSS2}$ (F) of FIG. 6m on the falling edge of $V_{C2}$.

$V_{DSS2}$ (R) is input to OR gate $G_2$ of FIG. 3 and the output of OR gate $G_2$, $V_{G2}$, shown in FIG. 6o is input to SAMPLE & HOLD2 100 of FIG. 3. The output of SAMPLE & HOLD2 100 of FIG. 3, $V_{SH2}$, is denoted as $V_1$, and is depicted in FIGS. 6d and 6p. $V_1$, in FIG. 6d, is the value of $V_{MR1}$ at the rising edge of $V_{C2}$ of FIG. 6g and is applied to the positive input of comparator $C_3$ of FIG. 3.

$V_{DSS2}$ (F) is input to OR gate $G_1$, of FIG. 3 and the output of OR gate $G_1$, $V_{G1}$, shown in FIG. 6n is input to SAMPLE & HOLD1 98 of FIG. 3. The output of SAMPLE & HOLD1 98 of FIG. 3, $V_{SH1}$, is denoted as $V_2$ and is depicted in FIGS. 6d and 6q. $V_2$, in FIG. 6d, is the value of $V_{MR1}$ at the falling edge of $V_{C2}$ of FIG. 6g and is applied to the negative input of comparator $C_3$ of FIG. 3.

As can be seen in FIG. 6d and by comparing FIG. 6p to FIG. 6q, $V_2$ is greater than $V_1$. Thus the output of comparator $C_3$ of FIG. 3, $V_{C3}$, will have a low value as shown in FIG. 6r. $V_{C3}$ in FIG. 3 is input to FLIP-FLOP 94 and is transferred to the output of the FLIP-FLOP where it appears as $V_{OUT}$ upon reception of the falling edge of a clock pulse, $V_{SS}$, to the FLIP-FLOP from the output of FALLING EDGE SINGLE SHOT 92.

The clock pulse, $V_{SS}$, is shown in FIG. 6i. $V_{SS}$ is the output of FALLING EDGE SINGLE SHOT 92 of FIG. 3. The FALLING EDGE SINGLE SHOT 92 of FIG. 3 generates the pulse $V_{SS}$ upon the falling edge of $V_{G3}$ of FIG. 6h which is obtained from the falling edge of $V_{C2}$ via OR gate $G_3$ of FIG. 3. Thus, when the clock pulse, $V_{SS}$, is input to FLIP-FLOP 94 of FIG. 3, $V_{OUT}$ will have a low value as depicted in FIG. 6s indicating, in this case, a CCW rotation of the target wheel 10' of FIG. 3.

FIG. 7 shows the wave forms generated from FIG. 3 due to the passage of a falling edge 36' of a tooth 12' of a target wheel 10' rotating in a counterclockwise (CCW) direction.

The sensors MR1 and MR2 are initially adjacent to a tooth 12' of the target wheel 10' which is rotating in a CCW direction as shown in FIG. 7a and $V_{MR1}$ and $V_{MR2}$ have a high value as depicted in (a) of FIG. 7d. As the target wheel 10' rotates CCW, MR2 becomes adjacent to a slot 14' of the target wheel whereas MR1 is still adjacent to a tooth 12' but is approaching the slot as shown in FIG. 7b. During this time $V_{MR2}$ falls quickly to a low level whereas $V_{MR1}$ starts to fall as MR1 approaches the slot 14' as shown in (b) of FIG. 7d. As the target wheel 10' continues to rotate CCW, both MR1 and MR2 become adjacent to a slot 14' and $V_{MR1}$ and $V_{MR2}$ are at a low level as shown in (c) of FIG. 7d.

FIG. 7e depicts the differential voltage pulse $V_D$, which is positive in this case, thereby, producing a square wave output, $V_{C1}$, from comparator $C_1$ of FIG. 3, as shown in FIG. 7f, which is then input to DUAL SINGLE SHOT1 96 of FIG. 3. The DUAL SINGLE SHOT1 of FIG. 3 outputs a pulse $V_{DSS1}$ (R) of FIG. 7j on the rising edge of $V_{C1}$ as well as a pulse $V_{DSS1}$ (F) of FIG. 7k on the falling edge of $V_{C1}$.

$V_{DSS1}$ (R) is input to OR gate $G_1$ of FIG. 3 and the output of OR gate $G_1$, $V_{G1}$, shown in FIG. 7n is input to SAMPLE & HOLD1 98 of FIG. 3. The output of SAMPLE & HOLD1 98 of FIG. 3, $V_{SH1}$, is denoted as $V_1$, and is depicted in FIGS. 7d and 7q. $V_1$, in FIG. 7d, is the value of $V_{MR1}$ at the rising edge of $V_{C1}$, of FIG. 7f and is applied to the negative input of comparator $C_3$ of FIG. 3.

$V_{DSS1}$ (F) is input to OR gate $G_2$ of FIG. 3 and the output of OR gate $G_2$, $V_{G2}$, shown in FIG. 7o is input to SAMPLE & HOLD2 100 of FIG. 3. The output of SAMPLE & HOLD2 100 of FIG. 3, $V_{SH2}$, is denoted as $V_2$ and is depicted in FIGS. 7d and 7p. $V_2$, in FIG. 7d, is the value of $V_{MR1}$ at the falling edge of $V_{C1}$, of FIG. 7f and is applied to the positive input of comparator $C_3$ of FIG. 3.

As can be seen in FIG. 7d and by comparing FIG. 7p to FIG. 7q, $V_1$, is greater than $V_2$. Thus the output of comparator $C_3$ of FIG. 3, $V_{C3}$, will have a low value as shown in FIG. 7r. $V_{C3}$ in FIG. 3 is input to FLIP-FLOP 94 and is transferred to the output of the FLIP-FLOP where it appears as $V_{OUT}$ upon reception of the falling edge of a clock pulse, $V_{SS}$, to the FLIP-FLOP from the output of FALLING EDGE SINGLE SHOT 92.

The clock pulse, $V_{SS}$, is shown in FIG. 7i. $V_{SS}$ is the output of FALLING EDGE SINGLE SHOT 92 of FIG. 3. The FALLING EDGE SINGLE SHOT 92 of FIG. 3 generates the pulse $V_{SS}$ upon the falling edge of $V_{G3}$ of FIG. 7h which is obtained from the falling edge of $V_{C1}$ via OR gate $G_3$ of FIG. 3. Thus, when the clock pulse, $V_{SS}$, is input to FLIP-FLOP 94 of FIG. 3, $V_{OUT}$ will have a low value as depicted in FIG. 7s indicating, in this case, a CCW rotation of the target wheel 10' of FIG. 3.

The Table of FIG. 8 summarizes how the direction of rotation is obtained from a single tooth edge 36' from a knowledge of the polarity of the differential signal pulse, $V_D$, and whether the output signal, in this example, $V_{MR1}$, is rising or falling within the differential pulse interval. It is understood by those knowledgeable in the art that $V_{MR2}$ or a combination of $V_{MR1}$ and $V_{MR2}$ could also be used as the output signal within the differential pulse interval within the scope of the present invention.

It is to be understood that while magnetoresistors (MRs) were exemplified in the foregoing detailed description of a preferred embodiment of the present invention, other analogous sensing elements, such as hall elements my be utilized, the class of such sensors being inclusively denoted as magnetostatic elements.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An apparatus for detecting direction of rotation of a toothed target wheel, comprising: a single differential sensor comprising a first magnetostatic element and a second magnetostatic element, said first and second magnetostatic elements being mutually spaced a predetermined distance apart;

means for magnetically biasing said single differential sensor;

a target wheel having a plurality of tooth edges providing a predetermined pitch, said target wheel being rotatively disposed in relation to said single differential sensor, said first and second magnetostatic elements being spaced circumferentially with respect to said target wheel;

current source means connected with said single differential sensor for providing first and second voltages respectively from each of said first and second magnetostatic elements responsive to each tooth edge of said plurality of tooth edges passing said single differential sensor; and signal conditioning circuit means connected with said single differential sensor for providing a voltage output responsive to said first and second voltages, wherein said output voltage is indicative of direction of rotation of said target wheel in relation to said single differential sensor;

wherein said predetermined distance is less than one-quarter said predetermined pitch.

2. The apparatus of claim 1, wherein said current source means provides matched currents to each of said first and second magnetostatic elements.

3. The apparatus of claim 2, wherein said first and second magnetostatic elements are mutually spaced in close proximity to each other.

4. The apparatus of claim 3, wherein said first and second voltages comprise two identical angularly offset signals.

5. The apparatus of claim 4, wherein said signal conditioning means comprises:

differential amplifier means for converting said offset signals into a differential signal having a polarity;

comparator means for being enabled responsive to the polarity and providing an output signal responsive to said enablement; and means for converting said output signal into a digital output signal providing said output voltage.

6. The apparatus of claim 5, wherein said comparator means further comprises reference voltage means for providing said enablement responsive to said differential signal reaching a predetermined threshold value.

7. The apparatus of claim 6, wherein said first and second magnetostatic elements are mutually spaced apart less than substantially two millimeters.

8. A method for detecting direction of rotation of a toothed target wheel comprising the steps of:

generating a first voltage responsive to passage of a tooth edge across a first predetermined location;

generating a second voltage responsive to passage of the tooth edge across a second predetermined location, wherein said first and second predetermined locations are closely proximate to each other, and wherein said first and second voltages comprise two identically angularly offset signals; and electronically processing said offset signals to provide an output voltage indicative of direction of rotation of the tooth edge across the first and second predetermined locations;

wherein said step of electronically processing comprises the steps of:

converting said offset signals into a differential signal having a polarity;

selectively enabling one of two comparators responsive to said polarity to thereby provide an output signal responsive to said enablement; and converting the output signal into a digital output signal providing said output voltage.

9. The method of claim 8, wherein said step of selectively enabling further comprises the step of providing said enablement responsive to the differential signal reaching a predetermined threshold value.

* * * * *